(12) United States Patent
Breeden

(10) Patent No.: US 10,152,142 B2
(45) Date of Patent: Dec. 11, 2018

(54) FOOT CONTROL FOR COMPUTER PROCESSOR

(71) Applicant: Toby Breeden, Mineral, WA (US)

(72) Inventor: Toby Breeden, Mineral, WA (US)

(*) Notice: Subject to any disclaimer, the term of this patent is extended or adjusted under 35 U.S.C. 154(b) by 86 days.

(21) Appl. No.: 15/385,681

(22) Filed: Dec. 20, 2016

(65) Prior Publication Data
US 2018/0173325 A1 Jun. 21, 2018

(51) Int. Cl.
*G06F 3/033* (2013.01)

(52) U.S. Cl.
CPC .................. *G06F 3/0334* (2013.01)

(58) Field of Classification Search
CPC .................................................. G06F 3/0334
See application file for complete search history.

(56) References Cited

U.S. PATENT DOCUMENTS

| | | | |
|---|---|---|---|
| 5,148,152 A | 9/1992 | Stueckle et al. | |
| D339,612 S | 9/1993 | Carter et al. | |
| 5,334,997 A * | 8/1994 | Scallon | G06F 3/0334 345/167 |
| 5,552,807 A | 9/1996 | Hayes et al. | |
| 5,635,957 A | 6/1997 | Feierbach et al. | |
| 5,745,055 A | 4/1998 | Redlich et al. | |
| 5,841,426 A * | 11/1998 | Dodson | G06F 3/0334 345/163 |
| 5,889,510 A | 3/1999 | Klarlund | |
| 6,008,797 A | 12/1999 | Sanderson et al. | |
| 6,611,250 B1 | 8/2003 | Prince et al. | |
| 7,156,026 B2 | 1/2007 | McClellion | |
| 7,369,116 B2 * | 5/2008 | Logue | G06F 3/011 345/156 |

(Continued)

FOREIGN PATENT DOCUMENTS

| | | |
|---|---|---|
| EP | 0480709 A2 | 4/1992 |
| EP | 1923107 A1 | 5/2008 |

OTHER PUBLICATIONS

Lemo 1640835 PC USB Foot Control Keyboard Action Switch Pedal HID by Lemo, https://www.amazon.com/Lemo%AD1640835%ADControl%ADKeyboard%ADAction/dp/B00B3PV47O, Sep. 13, 2016.

(Continued)

*Primary Examiner* — Peter D McLoone
(74) *Attorney, Agent, or Firm* — George A. Leone; Citadel Patent Law

(57) ABSTRACT

A foot control system for a computer processor including a platform attached to a pair of foot pedals, where each of the foot pedals is biased to be in contact with a depression switch when a downward force is applied. Control paddles are located around each foot pedal, wherein each of the plurality of control paddles is located proximately above a foot pedal such that an operator may activate each control paddle independently with movement of a foot. The control paddles are connected to a set of signal generating devices, where a first control paddle is located in an upper toe position, a second control paddle is located in a right side position, and a third control paddle is located in a left side position. A control processor receives control signals from the signal generating devices and transmits programming control signals to the computer processor.

21 Claims, 14 Drawing Sheets

(56) References Cited

U.S. PATENT DOCUMENTS

| | | | | |
|---|---|---|---|---|
| 7,554,526 B2* | 6/2009 | Logue | ................... | G06F 3/011 |
| | | | | 345/156 |
| 7,692,632 B2* | 4/2010 | Logue | ................... | G06F 3/011 |
| | | | | 345/156 |
| 7,990,366 B2* | 8/2011 | Logue | ................... | G06F 3/011 |
| | | | | 345/156 |
| 8,531,400 B2* | 9/2013 | Campbell | ............. | G06F 3/0334 |
| | | | | 345/163 |
| 9,235,261 B2* | 1/2016 | Enns | ................... | G06F 3/0334 |
| 9,874,944 B2* | 1/2018 | Khojasteh | ............. | G06F 3/0334 |
| 2005/0156878 A1* | 7/2005 | Logue | ................... | G06F 3/011 |
| | | | | 345/156 |
| 2008/0284725 A1* | 11/2008 | Logue | ................... | G06F 3/011 |
| | | | | 345/156 |
| 2010/0001948 A1* | 1/2010 | Logue | ................... | G06F 3/011 |
| | | | | 345/156 |
| 2010/0060614 A1* | 3/2010 | Enns | ..................... | A63F 13/06 |
| | | | | 345/184 |
| 2011/0084902 A1* | 4/2011 | Logue | ................... | G06F 3/011 |
| | | | | 345/157 |
| 2014/0267195 A1* | 9/2014 | Enns | ................... | G06F 3/0334 |
| | | | | 345/184 |
| 2016/0328028 A1* | 11/2016 | Khojasteh | ............. | G06F 3/0334 |
| 2018/0088684 A1* | 3/2018 | Dillon | .................. | G06F 3/0334 |

OTHER PUBLICATIONS

Fragpedal Quad PC Gaming Footpedal by Good Works Systems, https://www.amazon.com/FragpedalQuadPCGamingFootpedal/dp/B005GVWTS4, Sep. 13, 2016.

PS3 Racing Wheel Controller by Hori, https://www.amazon.com/PS3RacingWheelControllerPlaystation3/dp/B004G5TUJM, Sep. 13, 2016.

* cited by examiner

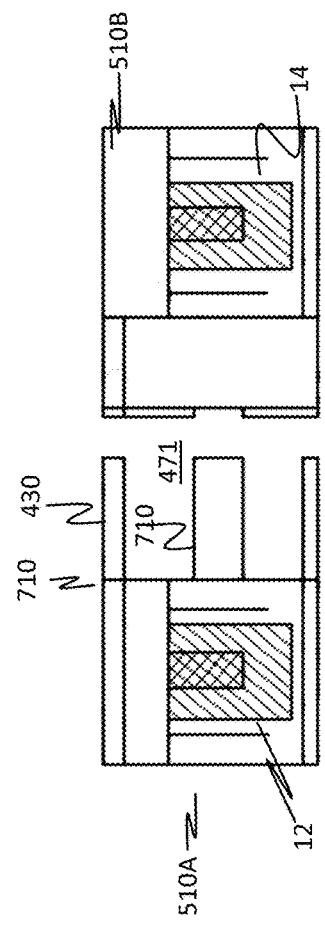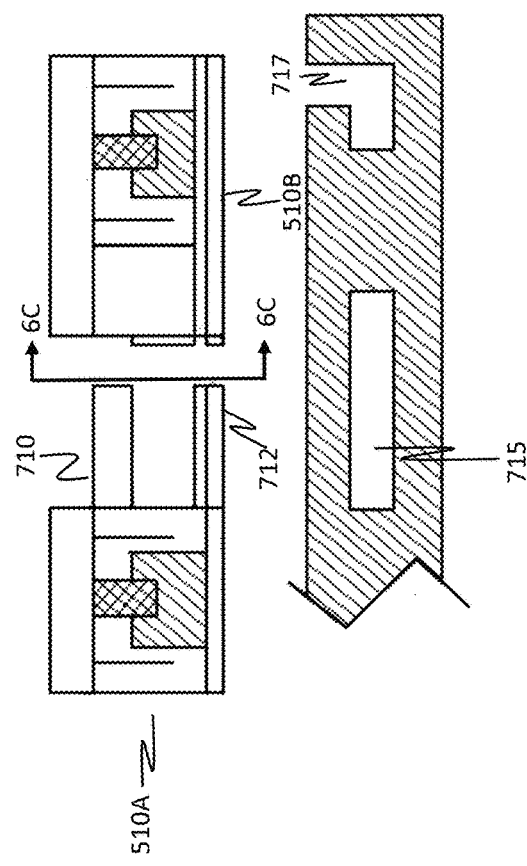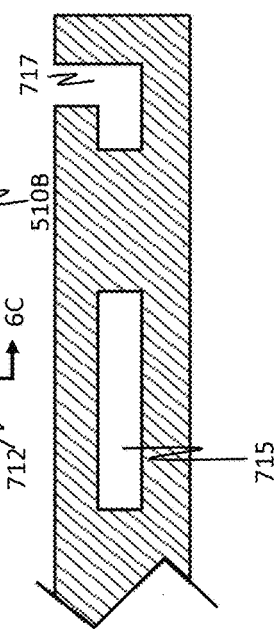

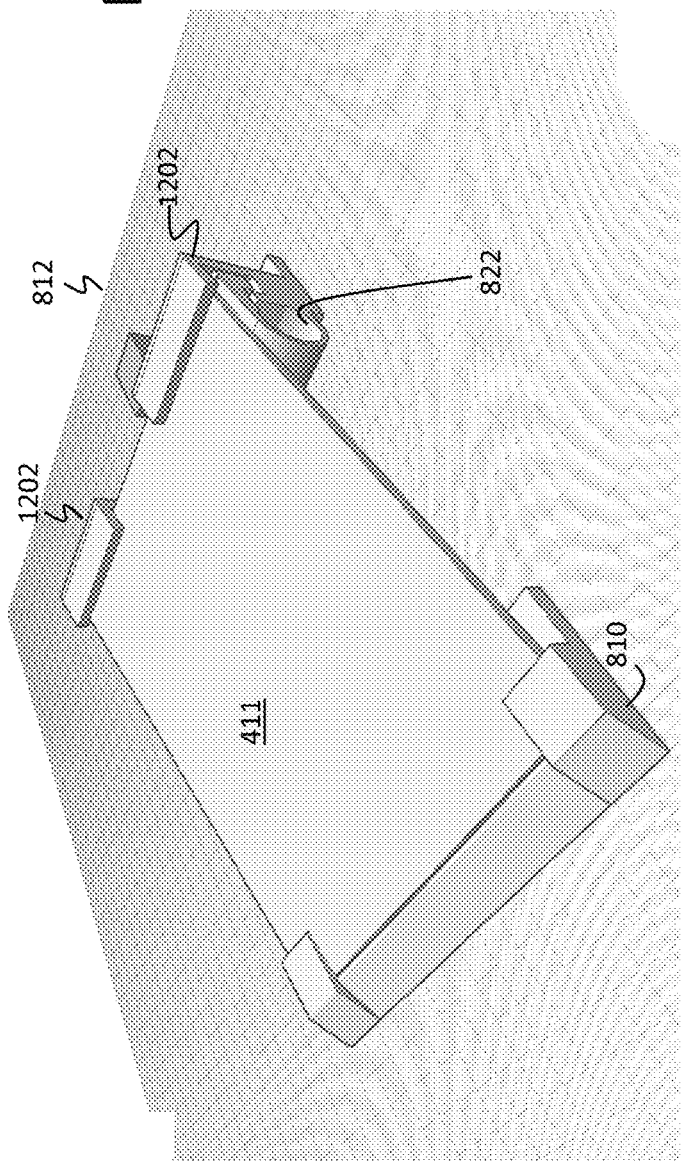

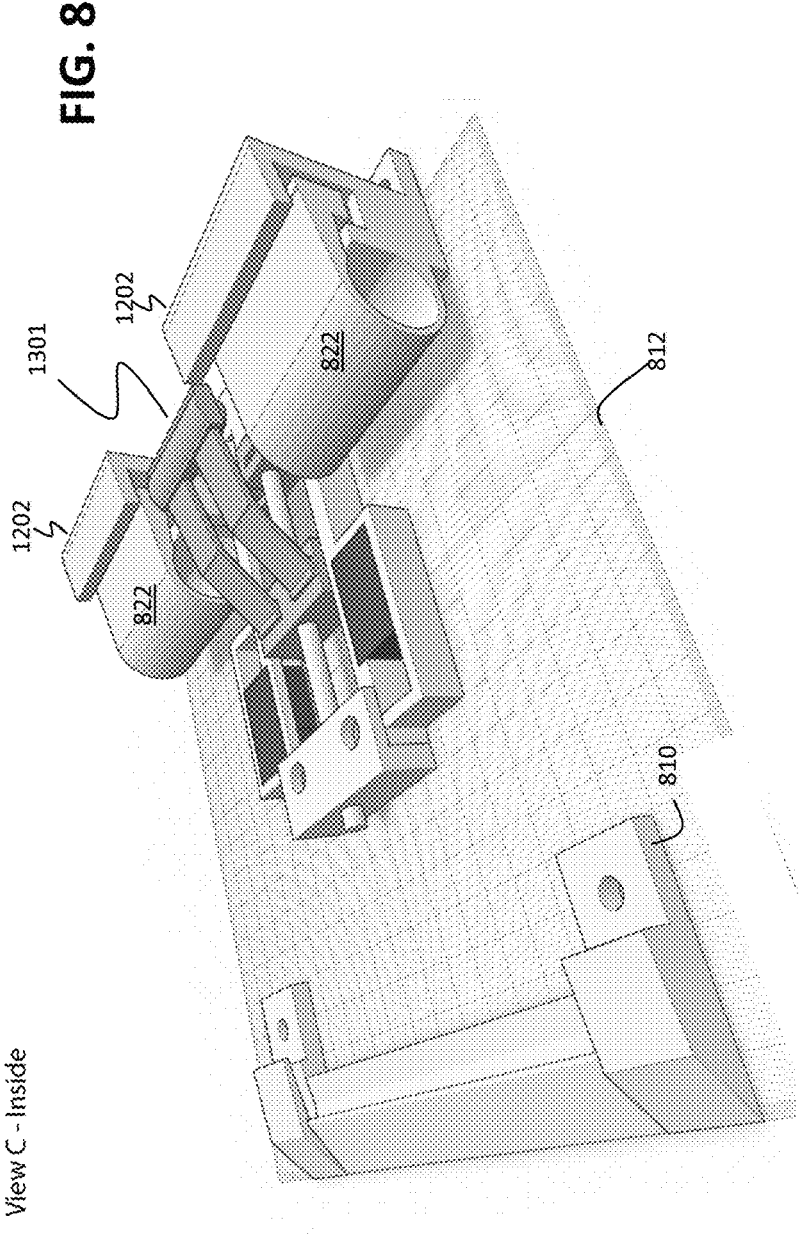

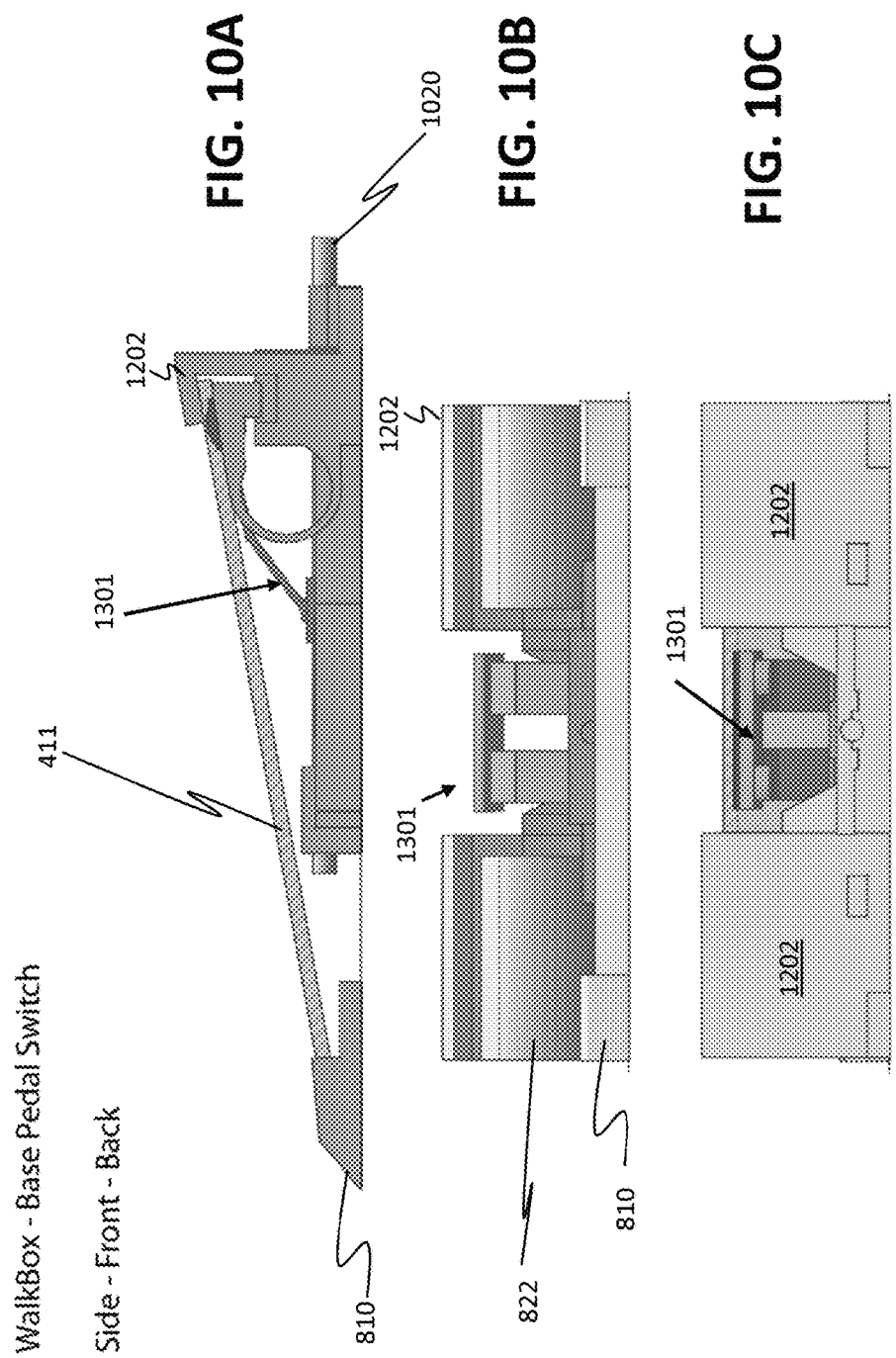

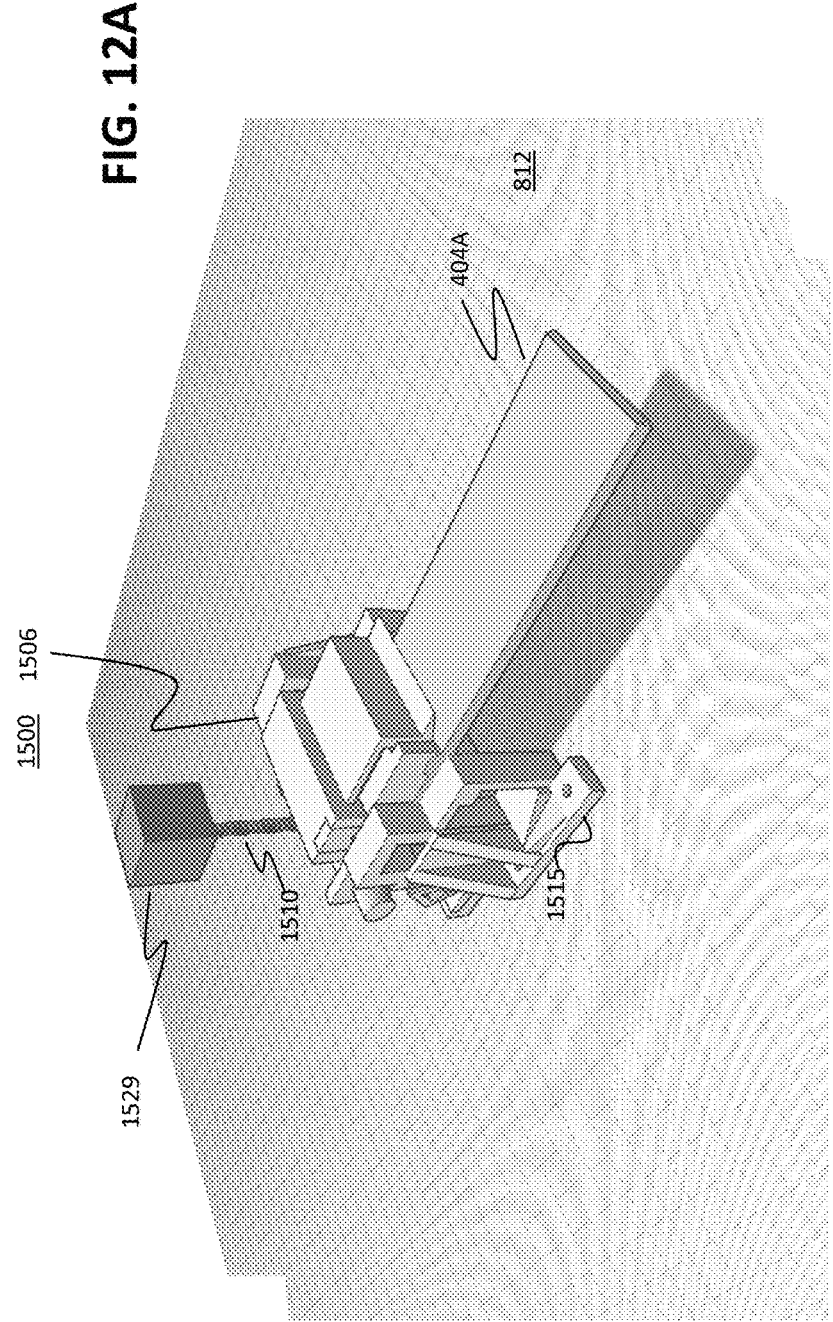

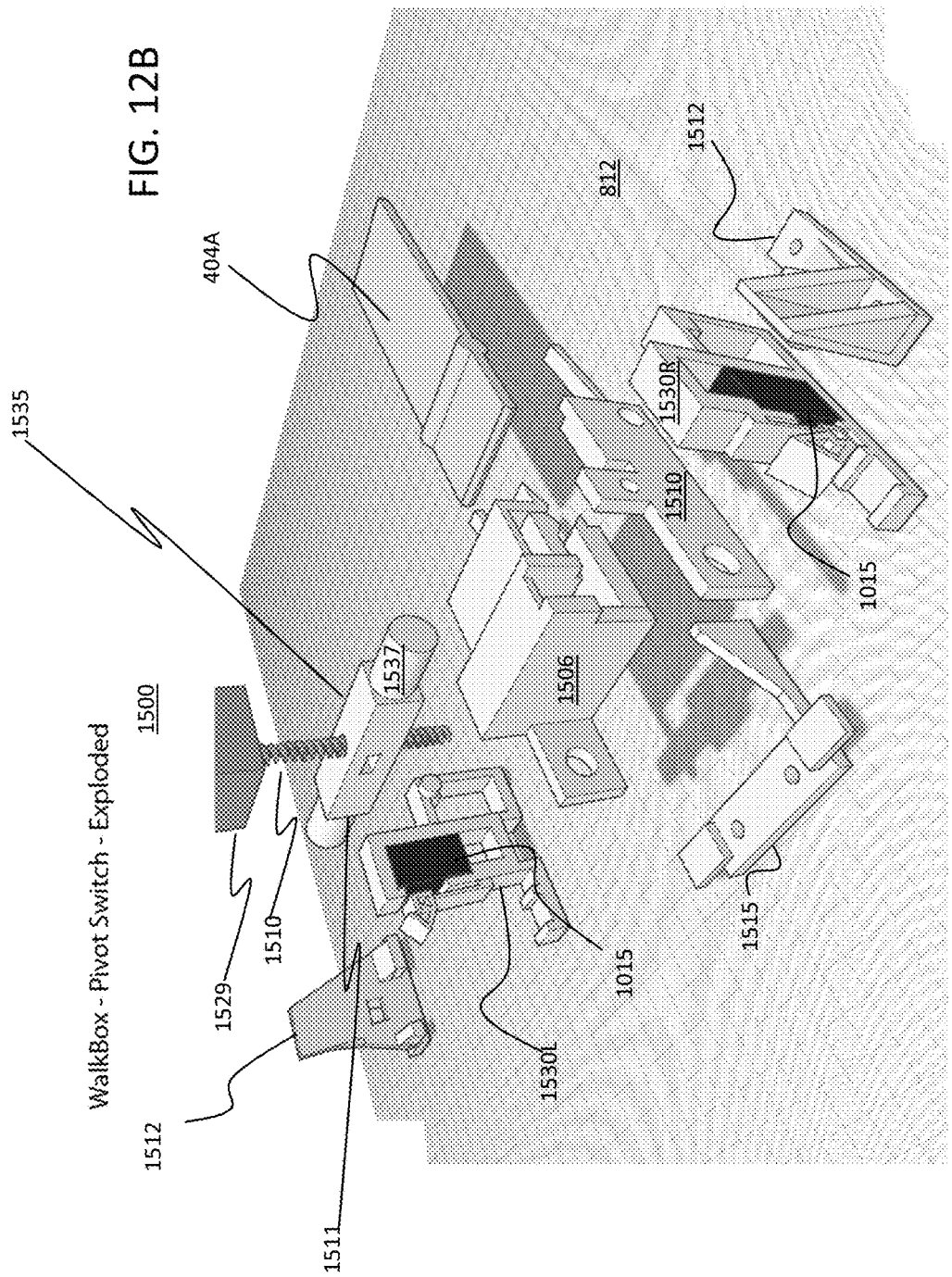

FOOT CONTROL FOR COMPUTER PROCESSOR

TECHNICAL FIELD

The present invention relates to video gaming and, more particularly, the invention relates to a foot control for a computer processor having multiple switching functions.

BACKGROUND

The use of personal computers and related devices is ubiquitous worldwide. In one area, there is an ever-expanding market for virtual reality (VR) computer applications, especially for entertainment such as games. In another area, there is an ongoing effort for providing assessable devices for the disabled. There is also a need in some instances for additional input devices to handle complex commands.

Virtual reality applications have been known to cause motion sickness to users due to the disconnect between visual motion and a lack of any physical motion or input. Currently available input devices do not satisfactorily address this issue.

With regard to disabled people who need to use computers, there are limited options for data, command and control inputs. This is especially true if the disabled person has little or no use of their hands. Although some have attempted to address this issue, presently available devices do not provide enough capability to satisfactorily solve the problems faced by a disabled user.

For example, U.S. Pat. No. 5,552,807, entitled "Foot Pedal Assembly for Use with Personal Computer," to Hayes et al. presents a foot pedal assembly that provides three inputs to a personal computer. Other patents and publications present various sensing means for manipulation by the feet. However, no device is currently available that provides multiple foot operated switches for each switch to enable dozens of discrete and unique computer inputs that can be activated by an operator's feet.

In a striking improvement over conventionally available computer foot controls, the present invention for the first time discloses a computer foot controller that provides a solution for all of the above issues. Presented here is a foot controller that solves the VR motion sickness problem, provides foot control for transmitting a myriad of complex computer control signals, and provides assessable computer control and/or gaming control for disabled persons.

BRIEF SUMMARY OF THE DISCLOSURE

This summary is provided to introduce, in a simplified form, a selection of concepts that are further described below in the Detailed Description. This summary is not intended to identify key features of the claimed subject matter, nor is it intended to be used as an aid in determining the scope of the claimed subject matter.

A foot control system for a computer processor is disclosed including a platform attached to a pair of foot pedals, where each of the foot pedals is biased to be in contact with a depression switch when a downward force is applied. Control paddles are located around each foot pedal, wherein each of the plurality of control paddles is located proximately above a foot pedal such that an operator may activate each control paddle independently with movement of a foot. The control paddles are connected to a set of signal generating devices, where a first control paddle is located in an upper toe position, a second control paddle is located in a right side position, and a third control paddle is located in a left side position. A control processor receives control signals from the signal generating devices and transmits programming control signals to the computer processor.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

FIG. 6A-FIG. 6C schematically illustrate components related to the expansion capabilities of an example of a computer foot controller.

FIG. 7 schematically illustrates an example of a foot base pedal as installed over a set of dual base switches.

FIG. 8 schematically illustrates an example of a set of dual base switches shown with the foot base pedal removed.

FIG. 10A, FIG. 10B and FIG. 10C, schematically illustrated side, front and back views respectively of a foot pedal base switch.

FIG. 12A schematically illustrates an example of a pivoting switch paddle unit as employed in one example of a foot controller.

FIG. 12B schematically illustrates an exploded view of an example of a pivoting switch paddle unit as employed in one example of a foot controller.

Figure 1:
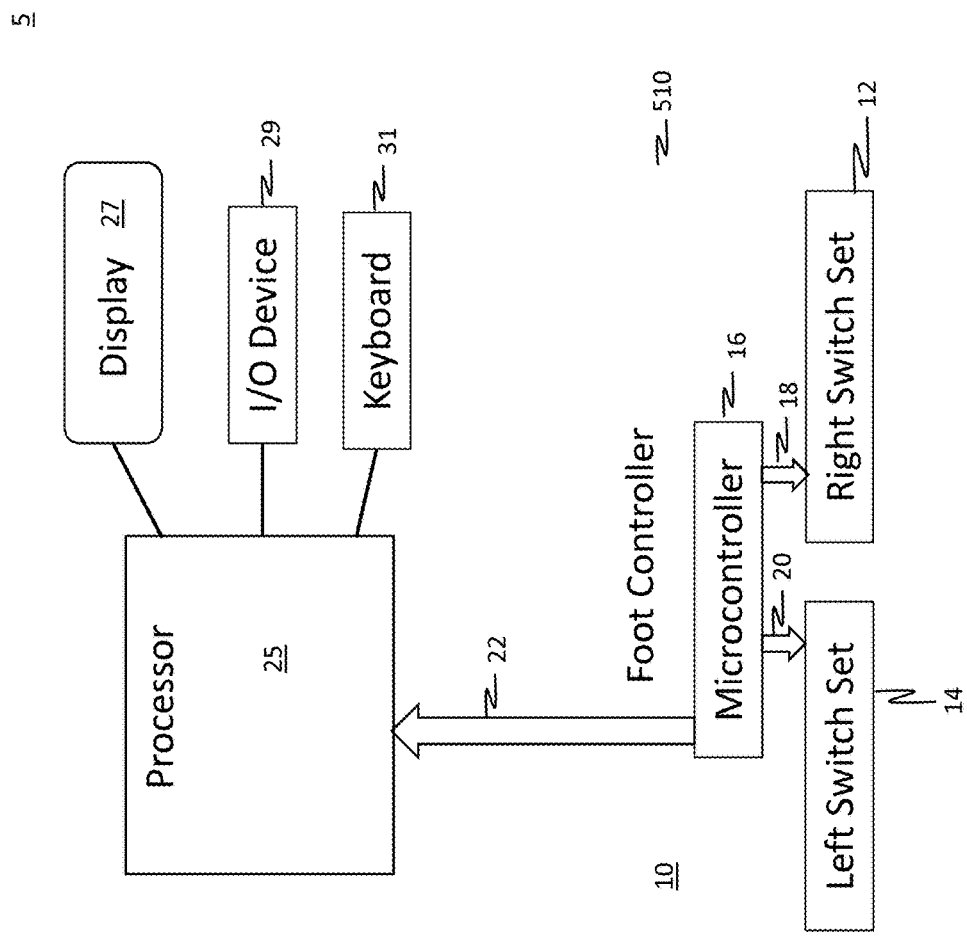
FIG. 1 schematically shows a high-level block diagram of a computer system including a foot controller.

In the drawings, identical reference numbers call out similar elements or components. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not necessarily intended to convey any information regarding the actual shape of the particular elements, and have been solely selected for ease of recognition in the drawings.

DETAILED DESCRIPTION OF THE PREFERRED EMBODIMENTS

The following disclosure describes a gaming foot controller. Several features of methods and systems in accordance with example embodiments are set forth and described in the figures. It will be appreciated that methods and systems in accordance with other example embodiments can include additional procedures or features different than those shown in the figures. Example embodiments are described herein with respect to an adjustable foot controller for a computer processor or video game system. However, it will be understood that these examples are for the purpose of illustrating the principles, and that the invention is not so limited.

Definitions

Generally, as used herein, the following terms have the following meanings, unless the use in context dictates otherwise:

The use of the word "a" or "an" when used in conjunction with the term "comprising" in the claims or the specification means one or more than one, unless the context dictates otherwise. The term "about" means the stated value plus or minus the margin of error of measurement or plus or minus 10% if no method of measurement is indicated. The use of the term "or" in the claims is used to mean "and/or" unless explicitly indicated to refer to alternatives only or if the alternatives are mutually exclusive. The terms "comprise", "have", "include" and "contain" (and their variants) are open-ended linking verbs and allow the addition of other elements when used in a claim.

As used herein, unless the context dictates otherwise, the phrase "electrically coupled to" includes electrical connections by any or all of electrical wiring, inductive coupling, wireless transmission such as Bluetooth® transmission, high-frequency radio waves, wireless Internet transmission (Wi-Fi) and the like.

As used herein, "plurality" is understood to mean more than one. For example, a plurality refers to at least two, three, four, five, ten, 25, 50, 75, 100, 1,000, 10,000 or more.

As used in this specification, the terms "processor" and "computer processor" encompass a personal computer, a tablet computer, a smart phone, a microcontroller, a microprocessor, a field programmable object array (FPOA), a digital signal processor (DSP), an application-specific integrated circuit (ASIC), a field programmable gate array (FPGA), a programmable logic array (PLA), or any other digital processing engine, device or equivalent capable of executing software code and equivalents.

Reference throughout this specification to "one example" or "an example embodiment," "one embodiment," "an embodiment" or combinations and/or variations of these terms means that a particular feature, structure or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Description

Referring now to FIG. 1, a high-level block diagram of a computer system including a foot controller is schematically shown. A foot controlled computer system 5 includes a foot controller 10 and a processor 25. The foot controller 10 further includes a microcontroller 16, a right switch set 12 and a left switch set 14. The microcontroller 16 is electrically coupled to the processor 25 by a first set of transmission lines 22. The right switch set 12 in the left switch set 14 are electrically coupled to the microcontroller by a second set of transmission lines 18, 20 respectively. The processor 25 is eventually connected to a display 27, and input output device 29 and a keyboard 31.

In one example, the input/output device 29 may be a pointing device such as a computer mouse or the like. The display 27 may be any useful computer display. Similarly, the keyboard may comprise any conventionally available keyboard compatible with the processor. The microcontroller 16 is described in more detail below. Note that the transmission lines 18, 20, 22 may include wireless transmission such as Bluetooth® transmission, high-frequency radio waves, wireless Internet transmission (Wi-Fi) and the like.

Figure 2:
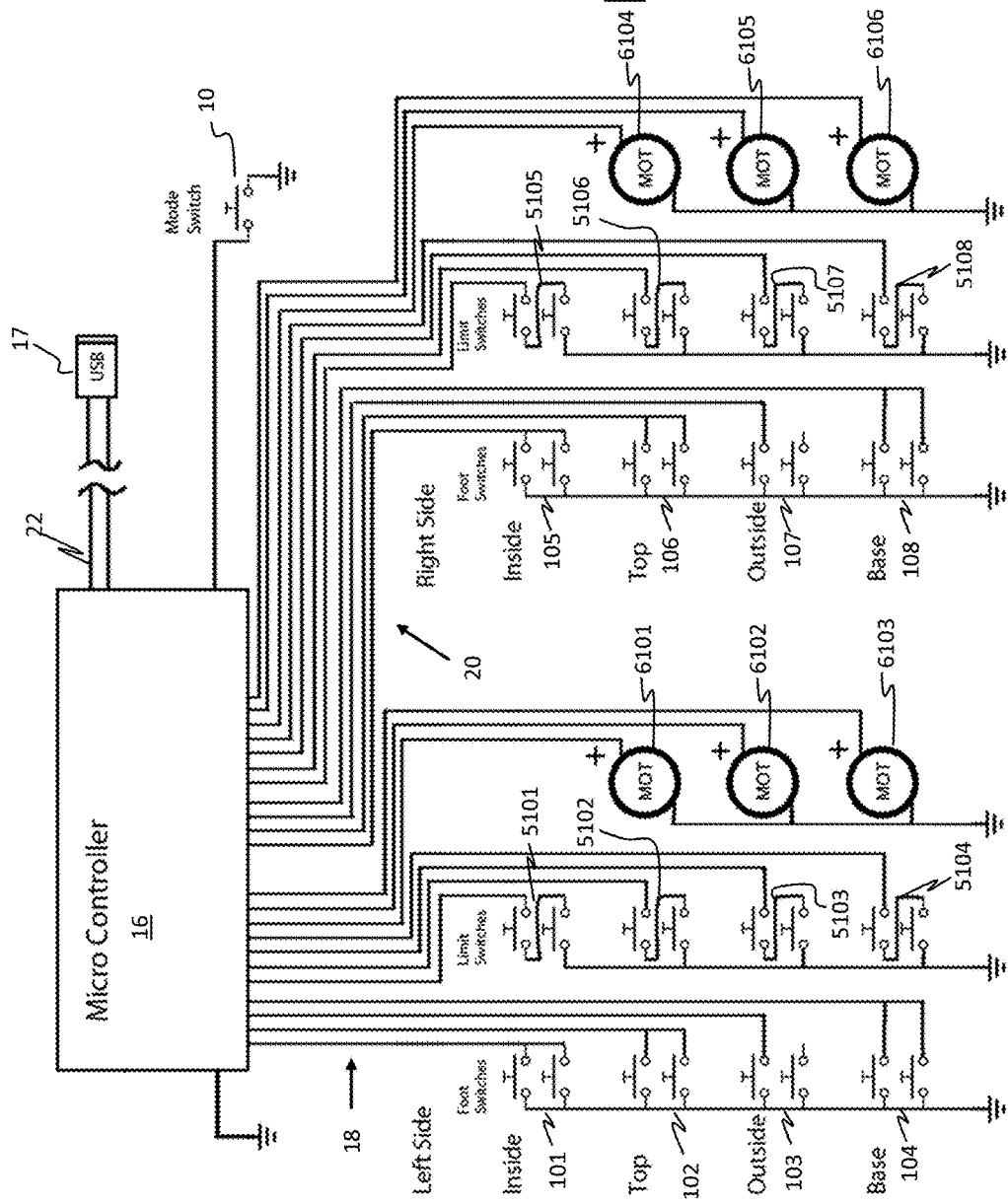
FIG. 2 schematically shows an example of a microcontroller circuit as implemented in a computer foot controller.

Referring now to FIG. 2, an example of a microcontroller circuit as implemented in a computer foot controller is schematically shown. The microcontroller 16 is connected by transmission lines 18, 20 to a plurality of switches 101-108. A first set of switches 101-104 are controlled by the left switch set 14. A second set of switches 105-108 are controlled by the right switch set 12. A Mode Switch 110 is also electrically coupled to the micro controller 16. The mode switch 110 may be integrated as part of either of the right or left switch sets, or may be implemented in a separate foot switch. In one useful example, the microcontroller may comprise a Teensyduino brand software compatible microcontroller which is commercially available. In a useful example of the foot controller, all switches may advantageously comprise normally open momentary contact micro switches as manufactured by Honeywell Micro Switch, Fort Mill, S.C. 29707. The mode switch may be used as desired to switch from, for example, gaming mode to computer control mode or other control modes.

Also connected to the microcontroller 16 are a series of electronic switches 5101-5108 and a plurality of positioning driver motors 6101-6106. Microcontroller 16 may be connected to the processor by means of a computer connector such as USB connector 17. The electronic switches 5101-5104 provide motion limits for switching pedals and foot resistance for the right side of the foot controller and electronic switches 5105-5108 provide motion limits and foot resistance for the left side of the foot controller. The positioning driver motors 6101-6106 are electronically and mechanically coupled to the limit switches through the micro controller and/or directly to limit switches to control pivoting motion and spring resistance as described in more detail below.

Figure 3:
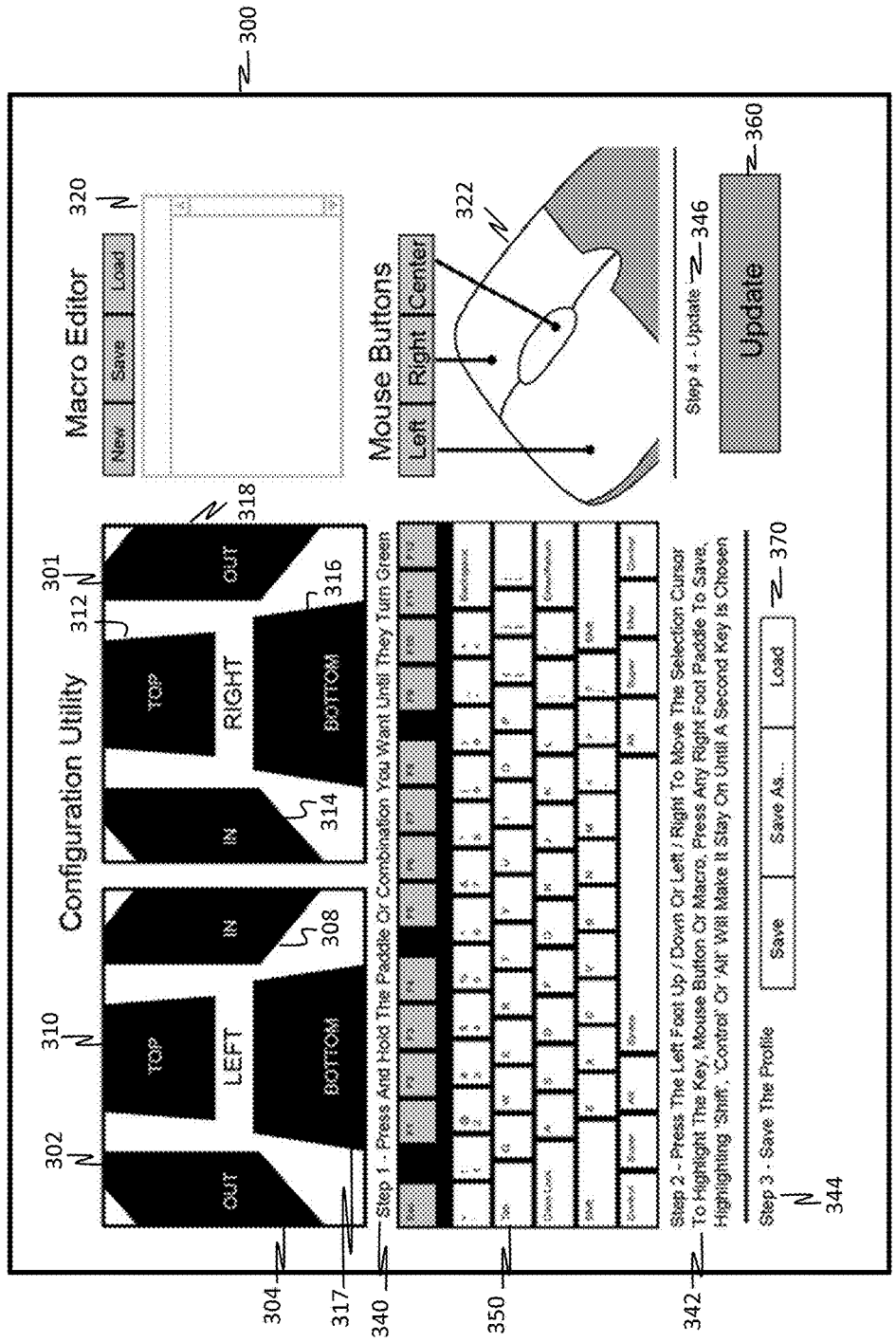
FIG. 3 schematically shows an example of a display showing visual indications of variations of foot control activations and modifications.

Referring now to FIG. 3, an example of a display showing visual indications of variations of foot control activations and modifications is schematically shown. A display 300 includes a right foot control display 301, a left foot control display 302, a keyboard display 350, a macro editor display 320, a mouse buttons display 322, an update button 360 and a plurality of indicia 340, 342, 344, 346. Each of the right foot control display 301 and the left foot control display 302 include geometric representations of corresponding foot controls of the foot controller 10. For example, right foot control display 301 may include a symbol for a right inside foot controller 314, a symbol for a right outside foot controller 318, a symbol for a right bottom foot controller 316, and a symbol for a right toe control 312. Similarly, left foot control display 302 may include a symbol for a left inside foot controller 308, a symbol for a left outside foot controller 304, a symbol for a bottom left foot controller 317 and a symbol for a left top toe control 310.

Still referring to FIG. 3, referring to the right hand side of the display 300, the macro editor 320 and mouse buttons symbol 322 are displayed along with the update button 360. The symbol for mouse buttons 322 may comprise a drawing of a conventional computer mouse showing, for example the left, right, and center and controls. The macro editor 320 may comprise any suitable software window wherein an operator may program in a macro (a small software program) or Load an already stored macro. This is accomplished by activating, as by clicking with the mouse, any one of the command buttons. For example, the command buttons may comprise "New," "Save," or "Load."

Modifications or additions to the functions of the various foot controller 10 components may be accomplished using a configuration utility program accessed through a computer display interface such as display 300. An operator may configure multiple profiles for various tasks, such as for different games, CAD/CAM programs, word processing and other applications by programming the configuration utility using the display. Once an operator has completed a profile it may be saved, saved as or loaded utilizing the screen buttons 370. Indicia 340, 342, 344, 346 may be displayed in order to guide the user through configuring a desired profile. In this example, the indicia comprise the following steps:

Step 1—Press and Hold the Paddle or Combination You Want until They Turn Green 340.

Step 2—Press the Left Foot up/down or Left/Right to Move the Selection Cursor to Highlight the Key Mouse Button or Macro, Press Any Right Foot Paddle to Save, Highlighting "Shift", "Control" or "Alt" Will Make It Stay on until a Second Key Is Chosen 342.

Step 3—Save the Profile 344.

Step 4—Update the Controller 346.

As will be evident to those skilled in the art familiar with computer software and controls, the above steps may be implemented using conventional software coding wherein various commands are activated by the operator using foot switches to manipulate the cursor to select the various displayed objects. In this way an operator can store multiple profiles assigning many combinations of computer commands and/or VR commands to the various switching mechanisms in the foot controller. Color coding may be advantageously implemented to aid in the creation of various configurations and profiles.

Figure 4:
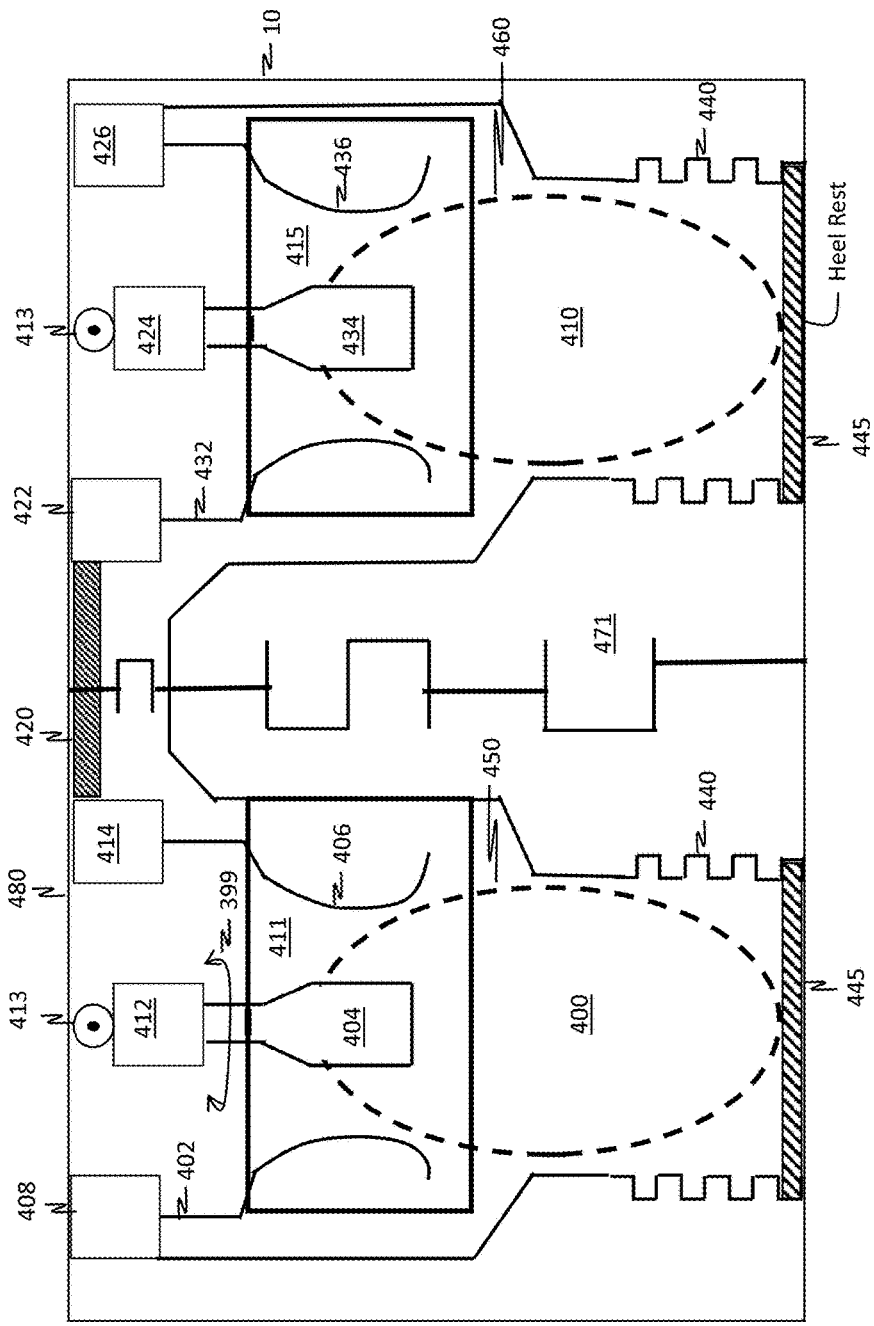
FIG. 4 schematically shows a top view of the bottom housing of a foot controller.

Referring now to FIG. 4, a top view of the bottom housing of a foot controller is schematically shown. The foot controller 10 includes a control section for the right foot 410 and a control section for the left foot 400. The two control sections are substantially symmetrical and include substantially identical components. A middle section 471 may include an arrangement of slots and rails used for purposes of combining top and bottom sections of the foot controller for easy transport and portability. The slots and rails in section 471 are described in more detail below. Broken line ovals 450, 460 represent the general region wherein an operator's foot may be placed. Each of the right and left sides include a plurality of foot control paddles including an outside foot paddle 402, 436, an inside foot paddle 406, 432, and toe paddles 404, 434. Each of the plurality of foot control paddles are connected to a micro switch housing 408, 412, 414, 422, 424 and 426. Each of the inside foot control pedals 406, 432 are connected to a pivot mechanism 420. The pivot mechanism 420 allows rotational motion in a generally vertical direction so that an operator can adjust the foot control paddle to their preferred foot position. Similarly, toe paddles 404, 434 may each advantageously be connected to a separate pivot mechanism 413 in order to allow the user to adapt the center toe paddles in a horizontal direction as indicated by curved double arrow 399. In one example, the outside foot paddles 402, 436 may be fixed. The pivot mechanisms may be otherwise configured or variations of movement in various directions depending upon the desired application. For example, it may be desirable in some instances to pivot the toe paddle transversely to the foot pedal. In such cases, the pivot mechanism would be located to pivot the pedal vertically in relation to the base.

In some examples, the pivot mechanisms 413 may comprise a worm drive and gear mechanism attached to the rear of the foot controller housing 480. The pivot mechanism 420 may comprise a similar arrangement, or any equivalent. The control paddles for the left and right switch sets may advantageously be arranged in a generally triangular configuration around a foot base pedal.

Still referring to FIG. 4, left and right base pedals 411, 415 are provided to allow input of control signals by depressing the base pedals. The mechanisms of the base paddles switches are discussed in more detail below. In addition to the paddles, symmetrically configured heel adjustment slots 440 may advantageously be provided for each foot. A pair of heel rests 445 are adapted to slide into the adjustment slots 440 so that the user can size the foot control region to the user's preferred position. Note that the plurality of paddles may be provided in any convenient geometric shape. They may be curved, straight, longer or shorter, wider or narrower and/or made of any substantially stiff material such as plastic, nylon, acrylics or the like.

Figure 5:
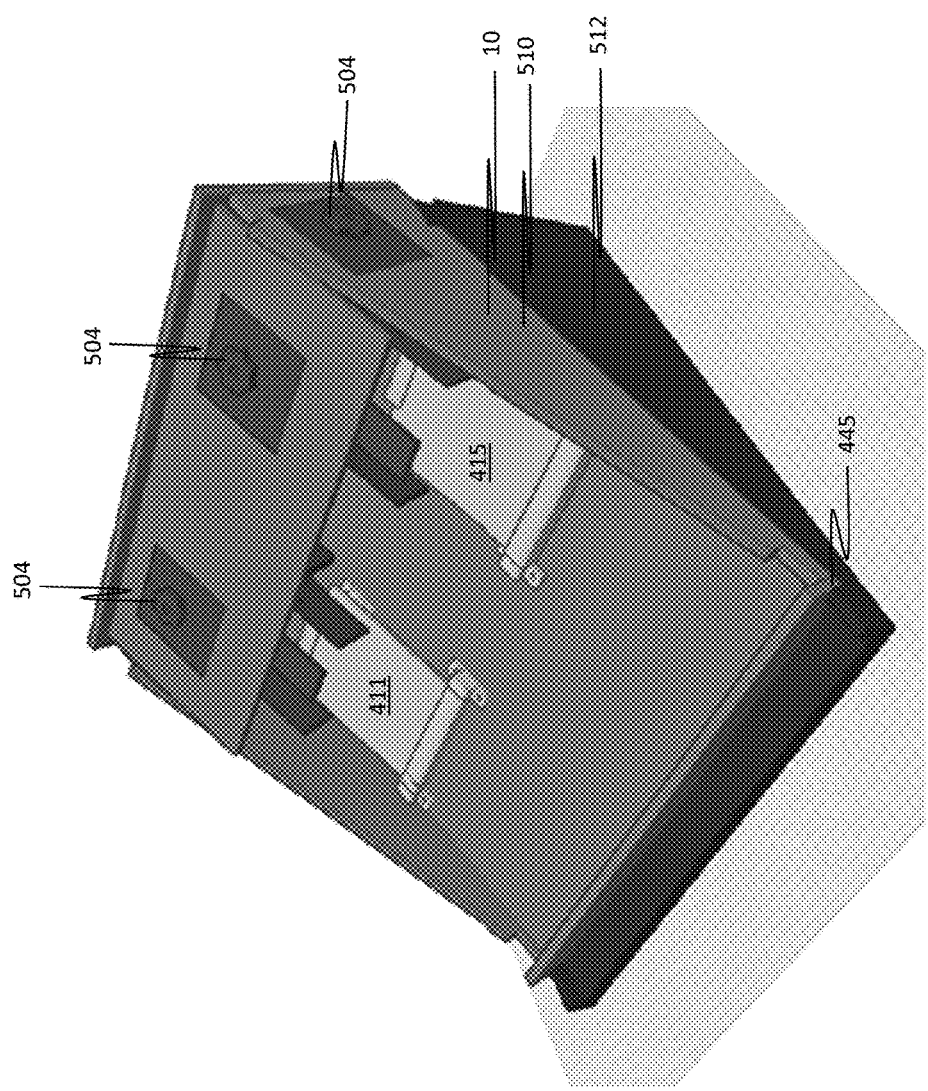
FIG. 5 schematically illustrates a perspective view of an example of a foot controller including adjustment knobs as contemplated in one example.

Referring now to FIG. 5, a perspective view of an example of a foot controller including adjustment knobs as contemplated in one example is schematically illustrated. Housing 510 includes the left base pedal 411 and the right base pedal 415 as well as the plurality of control paddles. Toe paddle adjustment knobs 502, 504 are attached to the top of the housing 510. Outside paddle and base pedal adjustment knobs 506 are preferably attached to the side of the housing 510. Other adjustment knobs may be provided as necessary. Linkages from the adjustment knobs to the various paddles and pedals are not shown to simplify the drawings, but are provided using conventional and well-known techniques. A top cover 512 may be used as a convenient platform on which the foot pedal housing 510 may rest during use. When stored, the foot pedal housing 510 may be inverted and mated to and inserted into the cover 512 thereby forming a box for easy storage and transport. A handle may be provided if desired. In more automated examples, the adjustment knobs may advantageously be replaced by electronic motors with drive screws as described herein.

Referring now to FIG. 6A-FIG. 6C, components related to the expansion capabilities of an example of a computer foot controller are schematically illustrated. FIG. 6A shows a top view of the foot controller wherein the left switch set 14 is separated from the right switch set 12. Thus the housing is split into two sections 510A and 510B. The arrangement of slots and rails 430 in the middle section 471 as described above are also separated. On the left-hand side with housing section 510A are a plurality of rails 710. The plurality of rails 710 may be of varying widths and lengths depending on the application. The plurality of rails 710 are adapted to be sized to slide into a corresponding plurality of channels, grooves or slots 715, 717 as shown with respect to housing section 510B. FIG. 6B shows a cutaway side view of the separated housing sections 510A, 510B. FIG. 6C is a view taken along the cut 6C, 6C on FIG. 6B. There shown are examples of channels. Channels 715 may have a substantially rectangular cross-section, whereas channel 717 used for adjoining corners of the housing sections may have a generally L shaped cross-section to accommodate L shaped rail 712. Of course, other types of sliding mechanisms and shapes may be used for expanding and joining different sections of the foot controller housing 510.

Referring now to FIG. 7, a foot base pedal as installed over a set of dual base switches is schematically illustrated. A right foot base pedal 411 is shown including a set of opposing base switches 1202. Each of the opposing base switches includes a spring mechanism 822. The foot base pedal 411 is mounted between a hinge mounting 810 and the pair of opposing base switches 1202. The hinge mounting 810 and each of the opposing base switches 1202 are mounted to the housing platform 812. The spring mechanisms under the left foot base pedal 415 are substantially identical to the mechanisms described above with reference to the right foot base pedal 411.

Referring now to FIG. 8, a set of dual foot pedal base switches is schematically illustrated. In this view the right foot base pedal 411 has been removed in order to illustrate better the positioning of the opposing base switches 1202. In one example, it is advantageous to use the dual opposing base switches 1202 in order to provide assurance that the switch signal is properly activated when the foot pedal base is depressed. Another advantage of using two switches is for added support when needed.

An adjustable resistance mechanism 1301 is mounted between the dual opposing base switches 1202 in order to provide custom foot pressure resistance. This is described in more detail with respect to FIG. 9.

Figure 9:
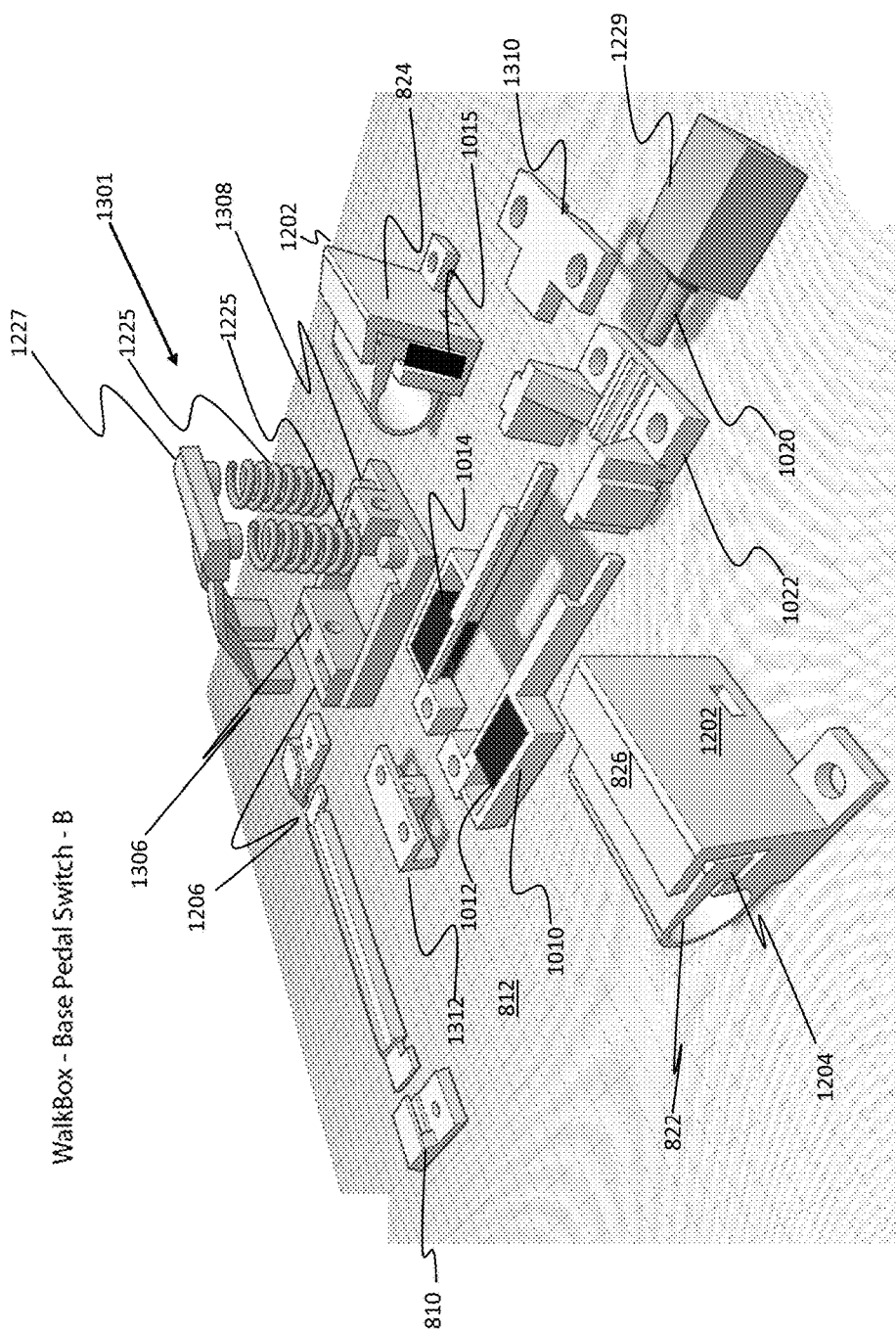
FIG. 9 schematically illustrates an example of an exploded view of the set of dual base switches as shown in FIG. 8 and associated components.

Referring now to FIG. 9, an exploded, detailed view of a foot pedal base switch is schematically illustrated. Each of the foot pedal base switches 1202 include a switch activation element 1204 and switch housing 824. A micro switch 1015 or other electrical depression switch is located in the switch housing 824. In operation, depressing the activation element 1204 will activate the depression switch 1015, thereby sending a control signal to the computer. The adjustable resistance assembly 1301 includes includes a pair of opposing spring elements 1225. The spring clip 1227 is mounted onto a spring clip base 1206. Each of the pair of opposing spring elements 1225 are retained by the spring clip 1227 and the spring clip base 1206. In one example, the spring clip base may include slots 1306 for holding one end of the spring clip 1227 and stubs 1308 for insertion into one end of each of the spring elements 1225. An upper panel 826 extends over the spring mechanism 822. All components are mounted on the housing base 812. Of course, other spring mechanisms and switch activation schemes may be employed as will be appreciated by those skilled in the art who have the benefit of this disclosure.

Also mounted to the foot controller housing is a limit switch housing 1010 which includes a first limit switch 1012 and a second limit switch 1014. In one example, the resistance assembly 1301 may include a driving motor 1229. In operation, the driving motor 1229 turns a (partially shown) drive screw 1020 which acts upon the captive springs 1225 to increase or reduce resistance by rotating in one direction or the other. The drive screw 1020 is inserted through a linear series of apertures aligned to accept the drive screw. A drive screw guide 1022 is connected to the limit switch housing 1010 to help align the drive screw. The drive screw is also inserted into and held in place by a drive screw top housing 1310 and a drive screw back mount 1312. The limit switches, and one example preferably micro switches, are located so as to be activated by the drive screw. The limit switches 1012 and 1014 have their activation contacts at opposite ends so that one can serve as an upper limit switch and another can serve as a lower limit switch to stop the motor from exceeding either. The first limit switch 1012 indicates a minimum distance of travel for the drive screw. The second limit switch 1014 indicates a maximum distance of travel for the drive screw. The base pedals 411, 415 are positioned over the adjustable resistance assembly 1301 so that when the motor is activated by a user, the user can feel the difference in resistance and select a desirable resistance.

In one example, as the drive screw is driven towards the second limit switch 1014, the springs 1225 increase resistance. Conversely, as the drive screw is withdrawn towards the first limit switch 1010, the springs are released to decrease pressure against the base foot paddle. In this way, the user can adjust the tension in the foot paddles to the user's preferred value. When the limit switch contact is made, a signal is transmitted from the activated limit switch to the motor to stop motor operation because the maximum or minimum travel distance has been reached. Of course, the switches may be raised in any suitable electrical configuration. Alternatively, no limit switches are needed in a less elegant design. Further, the motor may be replaced with a manual knob or the like. In some examples, spring tabs or other known actuation devices may be employed to cooperate with the motor and drive screw and allow activation of the limit switch contacts.

Referring now jointly to FIG. 10A, FIG. 10B and FIG. 10C, side, front and back views respectively of a foot pedal base switch are schematically illustrated. Referring specifically to FIG. 10A, a side view of a pedal assembly that shows how drive screw 1020 is inserted through the components of the resistance assembly 1301 in a linear fashion is shown. Also shown is the relationship between base pedal 411, for example, opposing base switches 1202 and the hinge mounting 810. When assembling, the base pedal 411 is captured by slots in the hinge mounting 810 at one end and inserted into the space between the tops of base switches 1202 and spring mechanisms 822.

Now referring specifically to FIG. 10B, a cutaway view of the front of the pedal mechanism is shown. Exposed are the spring resistance assembly 1301 and spring mechanisms 822. Generally the spring mechanisms 822 may be open ended cylindrical springs which are integrated with the other components of each base switch 1202. In a preferred embodiment, all of the components of a base switch 1202 may be made as a single plastic or nylon piece. Now referring specifically to FIG. 10C, and elevated view of the back of a foot pedal assembly is shown.

Figure 11A:
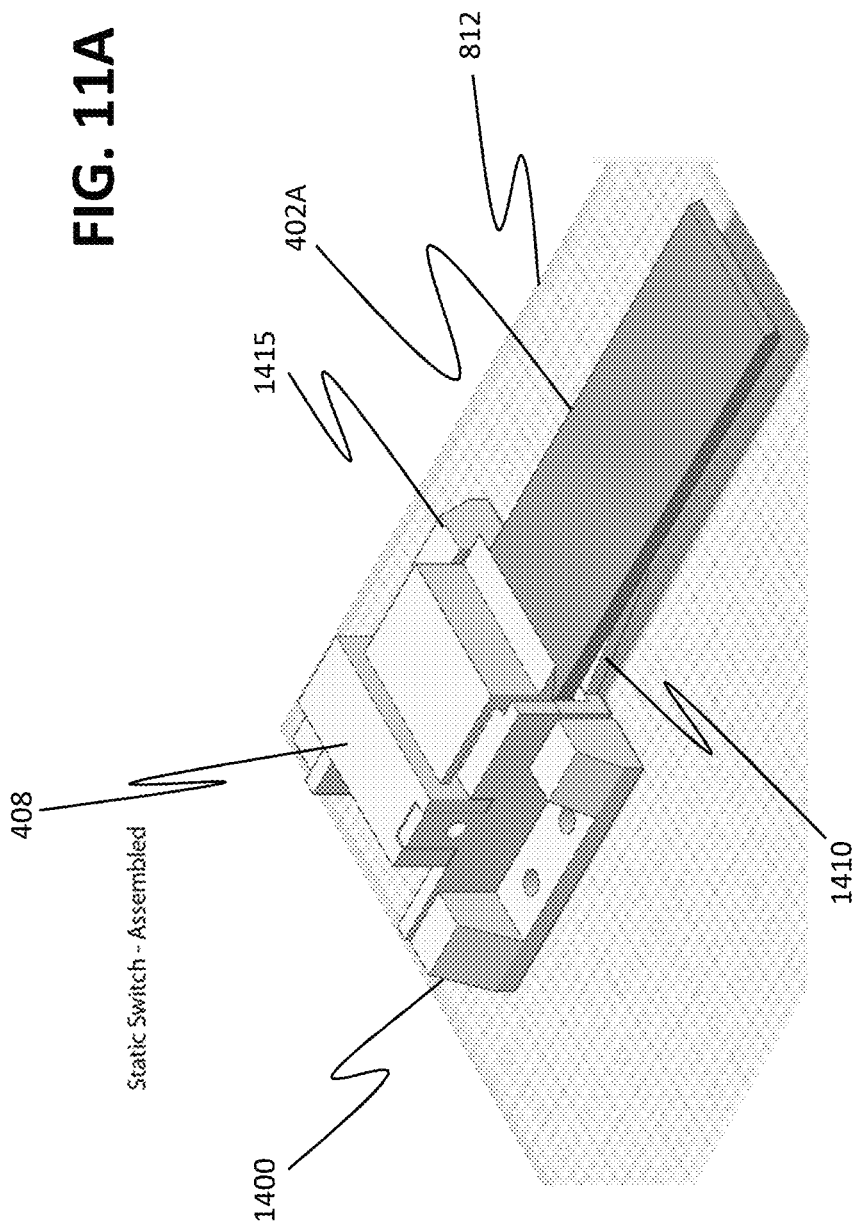
FIG. 11A schematically illustrates an example of a static switch paddle unit as employed in one example of a foot controller.

Referring now to FIG. 11A, an example of a static switch paddle unit as employed in one example of a foot controller is schematically illustrated. A static switch paddle unit 1400 includes a switch housing 408 and a paddle 402A. A spring element 1410 may bear against the bottom of paddle 402A to provide resistance and to return the paddle to a normal position. As illustrated above with respect to FIG. 9, for example, the switch housing may include a micro switch similar to micro switch 1015. The paddle and switch housing may be mounted to a base 1415 which, in turn, is mounted to the foot controller base 812. While this embodiment includes a flat paddle 402A, it will be understood that the paddle may be curved, flat or any geometric shape that would accommodate movement by contact with an operator's foot.

Figure 11B:
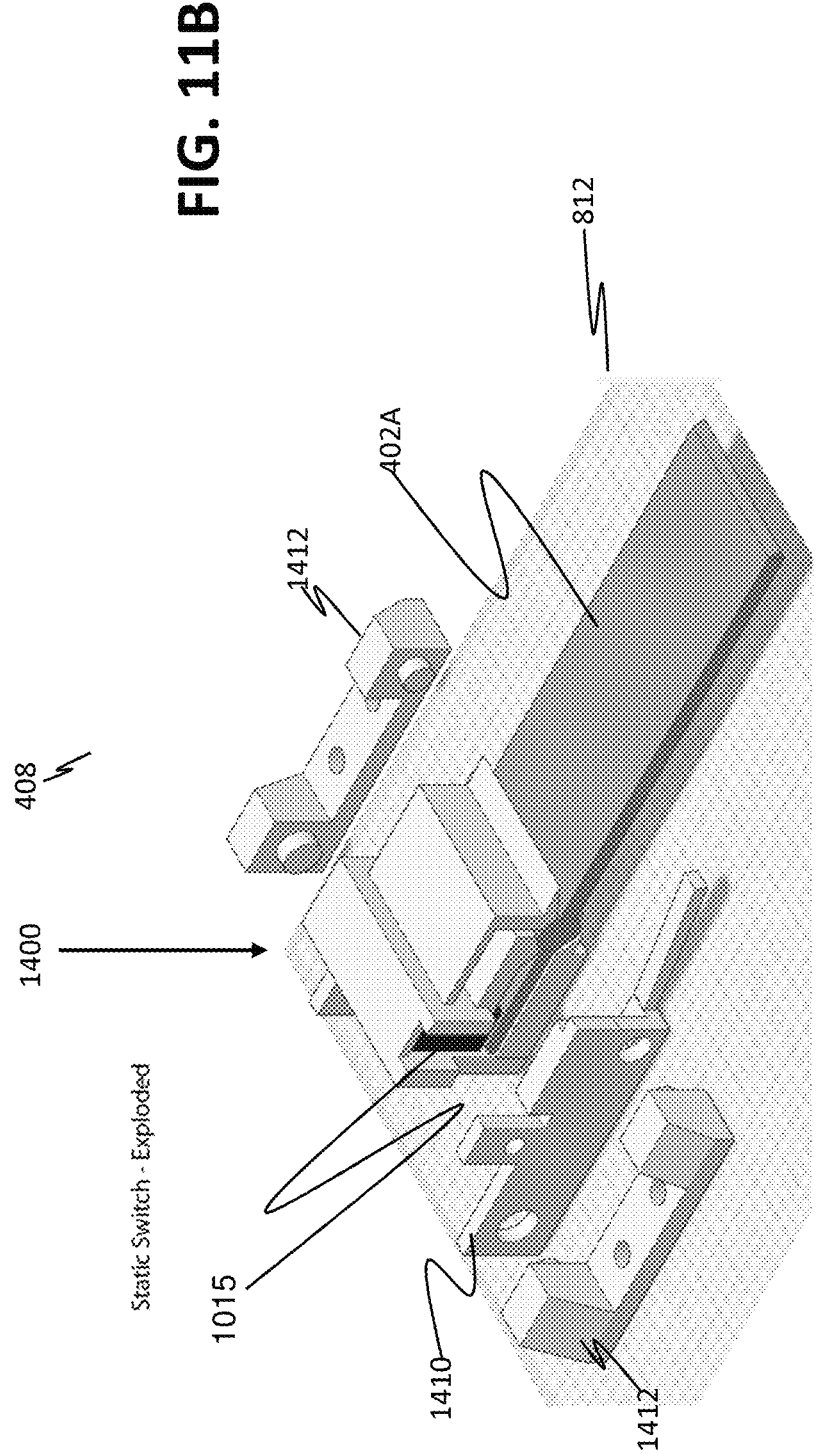
FIG. 11B schematically illustrates an exploded view of an example of a static switch paddle unit as employed in one example of a foot controller.

Referring now to FIG. 11B, an exploded view of an example of a static switch paddle unit as employed in one example of a foot controller is schematically illustrated. In this example, the static switch paddle unit 1400 includes two end caps 1412. Sandwiched between one end of the switch and a right or left and 1412 is the spring element 1410.

Referring now jointly to FIG. 12A and FIG. 12B, an example of a pivoting switch paddle unit as employed in one example of a foot controller is schematically illustrated and assembled and exploded views respectively. A pivoting switch paddle unit 1500 includes a switch housing 1506 and a paddle 404A. A spring element 1510 (as shown in FIG. 12B) may bear against the bottom of paddle 404A to provide resistance and to return the paddle to a normal position. As illustrated above with respect to FIG. 9, for example, the switch housing may include at least one micro switch similar to micro switch 1015. The paddle and switch housing may be mounted to a base 1515 which, in turn, is mounted to the foot controller housing platform 812. In a departure from the static switch described above, a pivoting mechanism 1511 including a drive screw 1514 and pivot block 1535 having pivot points 1537, is connected to a drive motor 1529 (or a control knob in another example) which is located on the outside surface of the housing as shown above with respect to FIG. 5. By activating the drive motor 1529 an operator can adjust the positioning of the pivoting switch as the housing together with the paddle will pivot about the pivoting block 1535. In this way the paddle can be made to pivot about a central axis linearly projected through the pivot points 1537.

As in the embodiments described above, while this embodiment illustrates a flat paddle 404A, it will be understood that the paddle may be curved, flat or any geometric shape that would accommodate movement by contact with an operator's foot. In this example, the pivoting switch paddle unit 1500 includes two end caps 1512. Sandwiched between one end of the switch and a right or left and 1512 is the spring element 1510. A pair of limit switch housings 1530R, 1530L are also attached to the switch housing 1506. The limit switch housings contain upper limit and lower limit electronic switches 1015. Note that the electronic limit switches may be identical part models, but their operation as upper or lower limit switches depends upon their positioning and electrical connections to the processor and motor 1529. The limit switches operate to keep the paddle from tilting outside of a range of acceptable pivoting limits.

Having described the components used in making the computer foot controller, it is now considered advantageous to the understanding of the invention to describe an example of operation of the foot controller. When in use, an operator can first use the configuration utility program to create a profile. In the case where profiles have been preloaded into the computer, an operator can merely load a profile for a particular application. In one example, the foot controller, through the use of six switching paddles and two base pedals provides 16 to 40 discrete paddle inputs which can provide keyboard and mouse commands. Thus, an operator can use the foot controller to replicate substantially all of the standard keyboard buttons and mouse buttons and activate them by use of their feet. Any keyboard and/or mouse combination can be assigned to any paddle combination. Any keyboard macro can be assigned to any paddle combination. Once the profile is loaded, the user may modify it by utilizing the configuration utility and following the screen directions and color-coded symbols for the foot base pedals, toe paddles, and switch paddles.

Physical adjustments may be made before or after programming in any profiles. Physical adjustments are made by using the control knobs to position the various pedals and paddles to a preferred arrangement. Adjustable paddle positions, as described above, allow for fine tuning of the fit to foot width and height, from a small foot to a large foot. In one example, the foot base pedal may be adjusted to an angle most comfortable for the user. In another example, the minimum distance required to trigger a paddle switch may be about 2 mm. Thus, disabled persons with minimal controllable foot movement should still be able to use the foot controller to effectively substitute for a keyboard and mouse without losing functionality. Any motorized version, custom adjustments of the paddle and pedal physical positioning may be accomplished using a utility program on the computer. Thus a disabled person would not need the help of another to make these physical adjustments.

Having completed a profile configuration and made the physical adjustments, an operator is now ready to use the foot controller to activate a computer, a videogame, or a virtual reality system. Other uses may include data entry, CAD/CAM, word processing and the like.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by different equipment, and devices, and that various modifications, both as to the equipment details and operating procedures, may be accomplished without departing from the true spirit and scope of the present invention.

What is claimed is:

1. A foot control system for a computer processor comprising:
   a platform;
   a pair of foot pedals attached to the platform, where each of the foot pedals is biased to make contact with an electronic depression switch when a downward force is applied;
   a plurality of control paddles located around each foot pedal, wherein each of the plurality of control paddles is located proximately above a foot pedal such that an operator may activate each control paddle independently with movement of a foot, wherein each of the control paddles is connected to one of a plurality of signal generating devices, wherein a first control paddle is located in an upper toe position, a second control paddle is located in a right side position, and a third control paddle is located in a left side position;
   a control processor electrically coupled to receive control signals from the plurality of signal generating devices at one or more inputs and having a plurality of computer control signal outputs for transmitting programming control signals to the computer processor; and
   a computer interface display electrically coupled to the control processor to provide a visual indication representative of the programming control signals, wherein the computer interface display includes a right foot control representation, a left foot control representation, a keyboard representation, a macro editor representation, a mouse buttons representation, an update button and a plurality of indicia.

2. The foot control system of claim 1 wherein the plurality of signal generating devices comprise micro switches.

3. The foot control system of claim 1 wherein the plurality of control paddles comprise opposing foot paddles located on either side of a foot base pedal and oriented substantially perpendicularly to the foot base pedal so as to be accessed by the side of an operator's foot.

4. The foot control system of claim 1 wherein the plurality of control paddles is curved inwardly to the base foot pedal.

5. The foot control system of claim 1 wherein the control processor comprises a microprocessor.

6. The foot control system of claim 1 wherein the computer processor is electrically coupled to a display, an input/output device and a keyboard.

7. The foot control system of claim 1 wherein the plurality of signal generating devices comprise normally open momentary contact micro switches.

8. The foot control system of claim 1 wherein each of the right foot control representation and the left foot control representation include geometric representations of corresponding foot controls of the foot controller.

9. A foot control system for a digital processor comprising:
- a housing having opposing end sections and a middle section;
- a controller mounted to, mounted in or coupled to the housing including transmission lines adapted to be electrically coupled to a computer processor;
- a right foot control section and a left foot control section, where the right and left foot control sections are substantially symmetrical and include substantially identical components and are located in the opposing end sections of the housing;
- where each of the right and left foot control sections include a plurality of control paddles including an outside foot paddle, an inside foot paddle, and a toe paddle arranged in a generally triangular configuration, and a foot base pedal;
- wherein each of the toe paddles are connected to a pivot mechanism in order to allow an operator to adjust the toe paddles in a horizontal direction;
- wherein each of the plurality of foot paddles are connected to a switch housing; wherein each switch housing includes a switch having an output connected to the controller; and
- wherein each of the inside foot pedals are connected to a pivot mechanism, where the pivot mechanism allows rotational motion in a generally vertical direction so that an operator can adjust the foot paddle to their preferred foot position.

10. The foot control system of claim 9 wherein the pivot mechanisms comprise a motorized worm drive and gear mechanism attached to the rear of the foot controller housing.

11. The foot control system of claim 9 further comprising: a plurality of foot base pedal adjustment mechanisms; a motor; and a plurality of worm drives electrically coupled to receive control signals from the motor, and mechanically coupled to the pedal adjustment mechanisms.

12. The foot control system of claim 11 wherein the plurality of foot base pedal adjustment mechanisms is adapted for mounting on a stepped platform or a sloped platform.

13. The foot control system of claim 12 wherein the plurality of foot base pedal adjustment mechanisms each comprise: a hinge connected to one end of the foot base pedal and mounted to the platform of the housing; a tension spring adjustment device mounted forward of the hinge; and a switch housing located at an opposing end of the base foot pedal, wherein the switch housing contains a micro switch.

14. The foot control system of claim 13 wherein the tension spring adjustment device is connected to be adjusted by adjustment knobs or with a motorized system.

15. The foot control system of claim 13 further comprising limit switches coupled to the foot base pedal adjustment system.

16. The foot control system of claim 9 further comprising heel adjustment slots located rearwardly in each of the opposing end sections wherein a heel rest is adapted to slide into the adjustment slots to a predetermined position.

17. The foot control system of claim 9 further comprising a plurality of adjustment knobs wherein a first set of the plurality of adjustment knobs is mechanically coupled to the right and left foot control section foot base pedals and a second set of the plurality of adjustment knobs is mechanically coupled to the plurality of control paddles.

18. The foot control system of claim 9 further comprising a plurality of motorized adjustment drives wherein a first set of the plurality of motorized adjustment drives is mechanically coupled to the right and left foot control section foot base pedals and a second set of the plurality of adjustment knobs is mechanically coupled to the plurality of control paddles.

19. The foot control system of claim 9 further comprising at least one extended heel.

20. The foot control system of claim 9 wherein the right foot control section and the left foot control section are expandable.

21. The foot control system of claim 9 wherein the each of the inside foot paddles and each of the toe paddles are each coupled to a separate pivot mounted in the housing.

\* \* \* \* \*